(12) United States Patent
Steckel et al.

(10) Patent No.: US 6,299,655 B1
(45) Date of Patent: Oct. 9, 2001

(54) DIESEL FUEL COMPOSITIONS

(75) Inventors: Thomas F. Steckel, Chagrin Falls;
Daniel T. Daly, Shaker Heights, both of OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 08/085,702

(22) Filed: Jun. 30, 1993

Related U.S. Application Data

(60) Continuation-in-part of application No. 07/936,700, filed on Aug. 27, 1992, now Pat. No. 5,230,714, which is a division of application No. 07/714,579, filed on Jun. 13, 1991, now Pat. No. 5,160,648, which is a division of application No. 07/390,439, filed on Aug. 3, 1989, now Pat. No. 5,053,152, which is a continuation of application No. 06/711,799, filed on Mar. 14, 1985, now abandoned.

(51) Int. Cl.$^7$ .................. C10L 1/18; C10L 1/22
(52) U.S. Cl. .................. 44/331; 44/418; 44/419
(58) Field of Search .............. 44/412, 418, 419, 44/432, 433, 331

(56) References Cited

U.S. PATENT DOCUMENTS

| | | | | |
|---|---|---|---|---|
| 3,200,106 | * | 8/1965 | Dickson et al. | 44/419 |
| 3,438,757 | * | 4/1969 | Honnen et al. | 44/432 |
| 3,565,804 | * | 2/1971 | Honnen et al. | 252/50 |
| 3,700,598 | * | 10/1972 | Plonsker et al. | 252/50 |
| 3,804,763 | * | 4/1974 | Meinhardt | 252/51.5 A |
| 3,948,800 | * | 4/1976 | Meinhardt | 44/386 |
| 3,957,854 | * | 5/1976 | Miller | 44/386 |
| 3,980,569 | * | 9/1976 | Pindar et al. | 44/415 |
| 4,234,435 | * | 11/1980 | Meinhardt et al. | 252/51.5 A |
| 5,053,152 | * | 10/1991 | Steckel | 508/558 |
| 5,160,648 | * | 11/1992 | Steckel | 508/476 |

* cited by examiner

*Primary Examiner*—Margaret Medley
*Assistant Examiner*—Cephia D. Toomer
(74) *Attorney, Agent, or Firm*—Joseph P. Fischer

(57) ABSTRACT

Diesel fuel oil compositions comprising high molecular weight, high total base number nitrogen containing dispersants provide exceptional diesel fuel injector cleanliness.

13 Claims, No Drawings

DIESEL FUEL COMPOSITIONS

CROSS REFERENCE TO RELATED APPLICATIONS

This application is a continuation-in-part of U.S. Ser. No. 07/936,700 filed on Aug. 27, 1992 U.S. Pat. No. 5,230,714, which is a divisional of U.S. Ser. No. 07/714,579 filed on Jun. 13, 1991, now U.S. Pat. No. 5,160,648, which is a divisional of U.S. Ser. No. 07/390,439 filed on Aug. 3, 1989, now U.S. Pat. No. 5,053,152, which is a continuation of U.S. Ser. No. 06/711,799 filed on Mar. 14, 1985, abandoned, the disclosures of which are hereby incorporated herein by reference in their entirety.

FIELD OF THE INVENTION

This invention relates to diesel fuel compositions containing high molecular weight, high base number, substantially ash-free dispersants.

BACKGROUND OF THE INVENTION

Diesel engines are compression-ignition engines. That is, compression of air within the cylinder generates the heat required to ignite the fuel as it is injected. Compression ratios of 12:1 to 23:1 are common. Other factors affecting combustion in the diesel engine are combustion chamber design and fuel injection characteristics. Each of these factors is provided by the design of the various mechanical components of the engine. Fuel quantity is another factor affecting combustion in the diesel engine.

Fuel additives are employed to improve diesel engine performance. A wide variety of additives are known, including cetane number improvers which improve the ignition quality of the fuel, stabilizers, smoke reducing additives, corrosion inhibitors and detergents/dispersants.

In the diesel combustion process fuel vaporization and efficient mixing with available air are essential in insuring efficient combustion. The fuel injection equipment provides the mechanical means of achieving this and its performance is critical in controlling rate of fuel injection and fuel atomization. Optimum performance is only achieved when the fuel injection system is free from deposits and adjusted in accordance with the manufacturer's recommendations. There is, however, a tendency for diesel fuels to form deposits during distribution and combustion and these can markedly affect the combustion process.

Critical deposits can form in two basic areas. A buildup of gum or resinous degradation products can occur in the injection system. In severe cases this can result in sticking of pump plungers and injector pintles or needles. Problems often only occur on isolated cylinders, with the resultant misfire causing loss of power and increased exhaust smoke. Carbon deposits build up on the parts of the injector exposed to hot combustion gases, which can affect both fuel flow and fuel atomization characteristics of the injector. Again, loss in power, increased exhaust smoke and poor starting are the noticeable engine performance problems.

Deposit buildup in fuel pumps and injectors is not a new problem, but in recent years it is becoming more apparent, particularly in areas where fuels containing increased proportions of cracked components are being used.

Deposit buildup has been evident in both direct and indirect injection engines. Chemical additives have been used in attempts to control formation of deposits. Generally, the additives have been various nitrogen-containing compounds.

As mentioned hereinabove, deposits can operating and non-operating parts of injectors. It been found that of the many types of additives available in the art, those having the particular characteristics described in greater detail hereinafter provide exemplary cleanliness for both operating and non-operating parts of diesel fuel injectors.

SUMMARY OF THE INVENTION

The present invention relates to a composition comprising a major amount of a diesel fuel oil meeting ASTM standard specification D-975 and a minor amount, sufficient to minimize deposit formation on diesel engine fuel injectors and to maintain design flow rates and spray patterns of said injectors, of a nitrogen-containing dispersant wherein the product obtained by multiplying the oil- and diluent free percent nitrogen of said dispersant by the weight average molecular weight (Mw) of said dispersant ranges from about 45,000 to about 100,000.

DETAILED DESCRIPTION OF THE INVENTION

As stated hereinabove, the present invention is directed to diesel fuel oil compositions containing certain nitrogen-containing additives. The nitrogen-containing additives are high molecular weight, high base number dispersants. The high base number of the dispersant is derived from the nitrogen content of the dispersant. The number obtained by multiplying the weight average molecular weight (Mw) of the dispersant by the oil- and diluent free percent nitrogen is a number ranging between about 45,000 to about 100,000. For purposes of this calculation, the percent nitrogen is that of the dispersant free of oil and other diluent. It is preferred that the molecular weight of the dispersant is at least about 2,000. The preferred minimum base number of the dispersant is about 30 as determined by ASTM Procedure D-974.

Examples of useful nitrogen-containing dispersant are carboxylic dispersants, including, imides, amides, imidazolines, amine-treated ester dispersants, etc., amine dispersants, Mannich dispersants and dispersant viscosity improvers.

In one embodiment, the dispersants may be post-treated with such reagents as urea, aldehydes, ketones, carboxylic acids, hydrocarbon-substituted succinic anhydrides, nitriles, epoxides, etc.

The nitrogen-containing carboxylic dispersants include reaction products of hydrocarbyl-substituted carboxylic acylating agents such as substituted carboxylic acids or functionally equivalent derivatives thereof with an amine.

The hydrocarbyl-substituted acylating agent may be derived from a monocarboxylic acid or a polycarboxylic acid. Polycarboxylic acids generally are preferred. The acylating agent may be a carboxylic acid or functionally equivalent derivative of the carboxylic acid such as the halides, lactones, esters, anhydrides, etc., preferably acid, esters or anhydrides, more preferably anhydrides. Preferably the carboxylic acylating agent is a succinic acylating agent. The hydrocarbyl-substituted carboxylic acylating agent includes agents which have a hydrocarbyl group derived from polyalkenes.

A number of acylated, nitrogen-containing compounds having a substituent of at least 10 aliphatic carbon atoms and made by reacting a carboxylic acid acylating agent with an amino compound are known to those skilled in the art. In such compositions the acylating agent is linked to the amino compound through an amido, amido, amidine or acyloxy ammonium linkage. The substituent of at least 10 aliphatic carbon atoms may be in either the carboxylic acid acylating agent derived portion of the molecule or in the amino compound derived portion of the molecule. Preferably, however, it is in the acylating agent portion. The acylating agent can vary from formic acid and its acylating derivatives to acylating agents having high molecular weight aliphatic substituents of up to 5,000, 10,000 or 20,000 carbon atoms.

A typical class of acylated amino compounds useful in making the compositions of this invention are those made by reacting an acylating agent having an aliphatic substituent of at least 10 carbon atoms and a nitrogen compound characterized by the presence of at least one

group. Typically, the acylating agent will be a mono- or poly-carboxylic acid (or reactive equivalent thereof) such as a substituted succinic or propionic acid. The aliphatic substituent in such acylating agents is often of at least about 50 and up to about 400 carbon atoms.

In another embodiment, the hydrocarbyl groups are derived from polyalkenes having a number average molecular weight ($\overline{Mn}$) value of at least about 1300 up to about 5000, and the $\overline{Mw}/\overline{Mn}$ value is from about 1.5 to about 4, preferably from about 1.8 to about 3.6, more preferably about 2.5 to about 3.2. The preparation and use of substituted succinic acylating agents wherein the substituent is derived from such polyalkenes are described in U.S. Pat. No. 4,234,435, the disclosure of which is hereby incorporated by reference.

$\overline{Mn}$ and $\overline{Mw}$ referred to herein are determined using well-known methods described in the literature. Examples of procedures for determining molecular weights are gel permeation chromatography (also known as size-exclusion chromatography) and vapor phase osmometry. For simpler materials, the values are calculated. These and other procedures Are described in numerous publications including:

P. J. Flory, "Principles of Polymer Chemistry", Cornell University Press (1953), Chapter VII, pp 266–316, "Macromolecules, an Introduction to Polymer Science", F. A. Bovey and F. H. Winslow, Editors, Academic Press (1979), pp 296–312, and U.S. Pat. No. 4,234,435.

These publications are hereby incorporated by reference for relevant disclosures contained therein relating to the determination of molecular weight.

Higher molecular weight dispersants are advantageously examined using a gel permeation chromatograph equipped with a detector that measures intrinsic viscosity of the eluent and provides molecular weight distributions. Millipore-Waters of Milford, Mass. manufactures such a unit under the name GPC 150 CV.

The hydrocarbyl-substituted carboxylic acylating agents are prepared by a reaction of one or more polyalkenes with one or more unsaturated carboxylic reagent. The unsaturated carboxylic reagent generally contains an alpha-beta olefinic unsaturation. The carboxylic reagent may be carboxylic acids per se and functional derivatives thereof, such as anhydrides, esters, amides, imides, salts, acyl halides, and nitrites. These carboxylic acid reagents may be either monobasic or polybasic in nature. When they are polybasic they are preferably dicarboxylic acids, although tri- and tetracarboxylic acids can be used. Specific examples of useful monobasic unsaturated carboxylic acids are acrylic acid, methacrylic acid, cinnamic acid, crotonic acid, 2-phenylpropenoic acid, etc. Exemplary polybasic acids include maleic acid, fumaric acid, mesaconic acid, itaconic acid and citraconic acid. Generally, the unsaturated carboxylic acid or derivative is maleic anhydride or maleic or fumaric acid or ester, preferably, maleic acid or anhydride, more preferably maleic anhydride.

The polyalkene may be reacted with the carboxylic reagent such that there is at least one mole of reagent for each mole of polyalkene that reacts. Preferably, an excess of reagent is used. This excess is generally between about 5% to about 25%.

In another embodiment, the acylating agents are prepared by reacting the above described polyalkene with an excess of maleic anhydride to provide substituted succinic acylating agents wherein the number of succinic groups or other acidic groups derived from maleic anhydride for each equivalent weight of substituent group is at least 1.3. The maximum number will not exceed 4.5. A suitable range is from about 1.4 to 3.5 and more specifically from about 1.4 to about 2.5 succinic groups per equivalent weight of substituent groups. In this embodiment, the polyalkene preferably has an Mn from about 1300 to about 5000 and a $\overline{Mw}/\overline{Mn}$ of at least 1.5. As described above, the value of $\overline{Mn}$ is preferably between about 1300 and 5000. A more preferred range for $\overline{Mn}$ is from about 1500 to about 2800, and a most preferred range of $\overline{Mn}$ values is from about 1500 to about 2400.

For purposes of this invention, the number of equivalent weights of substituent groups is deemed to be the number obtained by dividing the Mn value of the polyalkene from which the substituent is derived into the total weight of the substituent groups present in the substituted succinic acylating agents. Thus, if a substituted succinic acylating agent is characterized by a total weight of substituent group of 40,000, and the $\overline{Mn}$ value for the polyalkene from which the substituent groups are derived is 2000, then that substituted succinic acylating agent is characterized by a total of 20 (40,000/2000=20) equivalent weights of substituent groups. Therefore, that particular succinic acylating agent or acylating agent mixture must also be characterized by the presence within its structure of at least 26 succinic groups to meet one of the requirements of the succinic acylating agents used in this invention.

The ratio of succinic groups to the equivalent weight of substituent group present in the acylating agent can be determined from the saponification number or total acid number of the reacted mixture corrected to account for unreacted polyalkene present in the reaction mixture at the end of the reaction (generally referred to as filtrate or residue in the following examples). Saponification number is determined using the ASTM D-94 procedure. The formula for calculating the ratio from the saponification number is as follows:

$$\text{Ratio} = \frac{(\overline{Mn})\ (\text{Sap No., corrected})}{112{,}200 - 98\ (\text{Sap No., corrected})}$$

The corrected saponification number is obtained by dividing the saponification number by the percent of the polyalkene that has reacted. For example, if 10% of the polyalkene did not react and the saponification number of the filtrate or residue is 95, the corrected saponification number is 95 divided by 0.90 or 105.5.

The conditions, i.e., temperature, agitation, solvents, and the like, for reacting an acid reactant with a polyalkene, are known to those in the art. Examples of patents describing various procedures for preparing useful acylating agents include U.S. Pat. No. 3,215,707 (Rense); U.S. Pat. No. 3,219,666 (Norman et al); U.S. Pat. No. 3,231,587 (Rense); U.S. Pat. No. 3,912,764 (Palmer); U.S. Pat. No. 4,110,349 (Cohen); and U.S. Pat. No. 4,234,435 (Meinhardt et al); and U.K. 1,440,219. The disclosures of these patents are hereby incorporated by reference.

In another embodiment, the dispersant may also be an amine-treated ester dispersant, that is, the acylating agent may be an ester. The ester dispersant is prepared by reacting at least one of the above hydrocarbylsubstituted carboxylic acylating agents with at least one organic hydroxy compound. The amine may be present during the reaction with the hydroxy compound or the ester may be post-treated with an amine. In another embodiment, the ester dispersant is prepared by reacting the acylating agent with at least one hydroxy amine described herein.

The organic hydroxy compound includes compounds of the general formula $R''(OH)_m$ wherein R" is a monovalent or polyvalent organic group joined to the —OH groups through a carbon bond, and m is an integer of from 1 to about 10 wherein the hydrocarbyl group contains at least about 8 aliphatic compounds such as monohydric and polyhydric alcohols, or aromatic compounds such as phenols and naphthols. The aromatic hydroxy compounds from which the esters may be derived are illustrated by the following specific examples: phenol, beta-naphthol, alpha-naphthol, cresol, resorcinol, catechol, p,p'-dihydroxybiphenyl, 2-chlorophenol, 2,4-dibutylphenol, etc.

The alcohols from which the amine treated esters may be derived typically contain up to about 40 aliphatic carbon atoms, preferably from 2 to about 30, more preferably 2 to about 10. They may be monohydric alcohols such as methanol, ethanol, isooctanol, dodecanol, cyclohexanol, etc. In one embodiment, the hydroxy compounds are polyhydric alcohols, such as alkylene polyols. Preferably, the polyhydric alcohols contain from 2 to about 40 carbon atoms, more preferably 2 to about 20; and preferably from 2 to about 10 hydroxyl groups, more preferably 2 to about 6.

The amine-treated carboxylic ester dispersants may be prepared by any of several known methods. The method which is preferred because of convenience and the superior properties of the esters it produces, involves the reaction of the carboxylic acylating agents described above with one or more alcohols or phenols in ratios of from about 0.5 equivalent to about 4 equivalents of hydroxy compound per equivalent of acylating agent. The esterification is usually carried out at a temperature above about 100° C., preferably between 150° C. and 300° C. The water formed as a by-product is removed by distillation as the esterification proceeds. The preparation of useful carboxylic ester dispersant is described in U.S. Pat. Nos. 3,522,179 and 4,234,435.

As stated hereinabove, the ester dispersants are reacted with an amine, either as a post-treatment or the hydroxy compound and the amine may be present simultaneously during formation of the ester dispersant. The carboxylic ester dispersants may be further reacted with at least one of the above described amines and preferably at least one of the above described polyamines. In one preferred embodiment, the nitrogen-containing carboxylic ester dispersants are prepared by reacting about 1.0 to 2.0 equivalents, preferably about 1.0 to 1.8 equivalents of hydroxy compounds, and at least about 0.3 equivalent, preferably at least about 1.0 equivalent of amine per equivalent of acylating agent.

In another embodiment, the carboxylic acid acylating agent may be reacted simultaneously with both the alcohol and the amine. There is generally at least about 1.0 equivalent of the alcohol and at least 0.3 equivalent of the amine although the total amount of equivalents of the combination should be at least about 1.5 equivalent per equivalent of acylating agent. These nitrogen-containing carboxylic ester dispersant compositions are known in the art, and the preparation of a number of these and similar derivatives is described in, for example, U.S. Pat. Nos. 3,957,854 and 4,234,435 which are hereby incorporated by reference.

Among the carboxylic dispersants are the nitrogen-containing derivatives of bis(phenol substituted) carboxylic acids. These are prepared by reaction of alkyl phenols with various oxo-alkyl carboxylic acids, followed by subsequent reaction with amine containing compounds. U.S. Pat. No. 3,966,807, which is expressly incorporated herein by reference, contains disclosures of a number of useful compounds and methods for preparing them.

The following examples illustrate the carboxylic acylating agents and methods for preparing them. The desired acylating agents are sometimes referred to in the examples as "residue" without specific determination or mention of other materials present or the amounts thereof.

EXAMPLE I

A mixture of 510 parts (0.28 mole) of polybutene ($\overline{M}n=1845$; $\overline{M}w=5325$) and 59 parts (0.59 mole) of maleic anhydride is heated to 110° C. This mixture is heated to 190° C. in 7 hours during which 43 parts (0.6 mole) of gaseous chlorine is added beneath the surface. At 190–192° C. an additional 11 parts (0.16 mole) of chlorine is added over 3.5 hours. The reaction mixture is stripped by heating at 190–193° C. with nitrogen blowing for 10 hours. The residue is the desired polybutenyl-substituted succinic acylating agent having a saponification equivalent number of 87 as determined by ASTM procedure D-94.

EXAMPLE II

A mixture of 1000 parts (0.495 mole) of polybutene ($\overline{M}n=2020$; $\overline{M}w=6049$) and 115 parts (1.17 moles) of maleic anhydride is heated to 100° C. This mixture is heated to 184° C. in 6 hours during which 85 parts (1.2 moles) of gaseous chlorine is added beneath the surface. At 184–189° C. an additional 59 parts (0.83 mole) of chlorine is added over 4 hours. The reaction mixture is stripped by heating at 186–190° C. with nitrogen blowing for 26 hours. The residue is the desired polybutenyl-substituted succinic acylating agent having a saponification equivalent number of 87 as determined by ASTM procedure D-94.

EXAMPLE III

A polyisobutenyl succinic anhydride is prepared by reacting a chlorinated poly(isobutene) (having an average chlorine content of 4.3% and an average of 82 carbon atoms) with maleic anhydride at about 200°. The resulting polyisobutenyl succinic anhydride has a saponification number of 90.

EXAMPLE IV

A mixture of 1000 parts of polybutene having a number average molecular weight of about 1000 and 108 parts (1.1 moles) of maleic anhydride is heated to about 190° C. and 100 parts (1.43 moles) of chlorine are added beneath the surface over a period of about 4 hours while maintaining the temperature at about 185–190° C. The mixture then is blown with nitrogen at this temperature for several hours, and the residue is the desired polybutenyl-substituted succinic acylating agent.

EXAMPLE V

A solution of 1000 parts of the acylating agent of Example IV in 857 parts of mineral oil is heated to about 150° C. with stirring, and 109 parts (3.2 equivalents) of pentaerythritol are added with stirring. The mixture is blown with nitrogen and heated to about 200° C. over a period of about 14 hours to form an oil solution of the desired carboxylic ester intermediate.

EXAMPLE VI

A mixture is prepared by combining 2215 parts of a polybutene-substituted phenol prepared by boron trifluoride-phenol catalyzed alkylation of phenol with a polybutene having a number average molecular weight of approximately 1000 (vapor phase osmometry-VPO), 151.1 parts 50 percent aqueous glyoxylic acid (Hoechst Celanese) and 1.15 parts 70 percent aqueous methanesulfonic acid in a reactor equipped with a stirrer, thermowell, subsurface gas inlet tube and a Dean-Stark trap with a reflux condenser for water removal. The mixture is heated to 125° C. under a nitrogen sweep, water is collected in the Dean-Stark trap at 125–135° C. for 1.5 hours, the temperature is increased over 0.5 hours to 158° C. and held there for 2.5 hours, continuing water collection in the Dean-Stark trap.

EXAMPLE VII

A mixture of 3225 parts (5.0 equivalents) of the polyisobutene-substituted succinic acylating agent prepared in Example II, 289 parts (8.5 equivalents) of pentaerythritol and 5204 parts of mineral oil is heated at 225–235° C. for 5.5 hours. The reaction mixture is filtered at 130° C. to yield an oil solution of the desired product.

The above-described carboxylic acylating agents are reacted with amines to form the nitrogen-containing carboxylic dispersants of the present invention. The amine may be a monoamine or polyamine, typically a polyamine, preferably ethylene amines, amine bottoms or amine condensates. When monoamines are used, they are typically employed as a component of a mixture comprising polyamines. The amines can be aliphatic, cycloaliphatic, aromatic, or heterocyclic, including aliphatic-substituted cycloaliphatic, aliphatic-substituted aromatic, aliphatic-substituted heterocyclic, cycloaliphatic-substituted aliphatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted alicyclid, and heterocyclic-substituted aromatic amines and may be saturated or unsaturated.

The monoamines generally contain from 1 to about 24 carbon atoms, preferably 1 to about 12, and more preferably 1 to about 6. Examples of primary amines useful in the present invention include methylamine, ethylamine, propylamine, butylamine, cyclopentylamine, cyclohexylamine, octylamine, dodecylamine, allylamine, cocoamine, stearylamine, and laurylamine. Examples of secondary amines include dimethylamine, diethylamine, dipropylamine, dibutylamine, dicyclopentylamine, dicyclohexylamine, methylbutylamine, ethylhexylamine, etc. Tertiary amines include trimethylamine, tributylamine, methyldiethylamine, ethyldibutylamine, etc.

Another group of primary amine-containing compounds are the various amine terminated polyethers. The amine terminated polyethers are available commercially from Texaco Chemical Company under the general trade designation "Jeffamine®". Specific examples of these materials include Jeffamine® M-600; M-1000; M-2005; and M-2070 amines.

In another embodiment, the amine may be a hydroxyamine. Typically, the hydroxyamines are primary, secondary or tertiary alkanol amines or mixtures thereof. Such amines can be represented by the formulae:

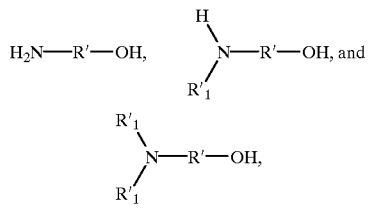

wherein each $R'_1$ is independently a hydrocarbyl group of one to about eight carbon atoms or hydroxyhydrocarbyl group of two to about eight carbon atoms, preferably one to about four, and R' is a divalent hydrocarbyl group of about two to about 18 carbon atoms, preferably two to about four. The group —R'—OH in such formulae represents the hydroxy-hydrocarbyl group. R' can be acyclic, alicyclic or aromatic group. Typically, R' is an acyclic straight or branched alkylene group such as an ethylene, 1,2-propylene, 1,2-butylene, 1,2-octadecylene, etc. group. Where two $R'_1$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each $R'_1$ is independently a methyl, ethyl, propyl, butyl, pentyl or hexyl group.

Examples of these alkanolamines include mono-, di-, and triethanol amine, diethylethanolamine, ethylethanolamine, butyldiethanolamine, etc.

The hydroxyamines can also be an ether N-(hydroxyhydrocarbyl)amine. These are hydroxypoly (hydrocarbyloxy) analogs of the above-described hydroxy amines (these analog s also include hydroxyl-substituted oxyalkylene analogs). Such N-(hydroxyhydrocarbyl) amines can be conveniently prepared by reaction of epoxides with aforedescribed amines and can be represented by the formulae:

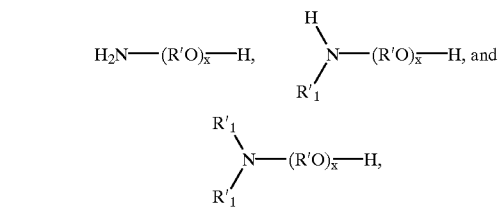

wherein x is a number from about 2 to about 15 and $R_1$ and R' are as des cribed above. $R'_1$ may also be a hydroxypoly (hydrocarbyloxy) group.

Suit able amines also include polyoxyalkylene polyamines, e.g., polyoxyalkylene diamines and polyoxyalkylene triamines, having average molecular weights ranging from about 200 to 4000 and preferably from about 400 to 2000. Illustrative examples of these polyoxyalkylene polyamines may be characterized by the formulae: $NH_2$-Alkylene $(O\text{-Alkylene})_m NH_2$, wherein m has a value of about 3 to 70 and preferably about 10 to 35; and R(Alkylene (O-Alkylene)$_n$NH$_2$)$_{3-6}$, wherein n is such that the total value is from about 1 to 40 with the proviso that the sum of all of the n's is from about 3 to about 70 and generally from about 6 to about 35 and R is a polyvalent saturated hydrocarbon radical of up to 10 carbon atoms having a valence of 3 to 6. The alkylene groups may be straight or branched chains and contain from 1 to 7 carbon atoms and usually from 1 to 4 carbon atoms. The various alkylene groups present may be the same or different.

The preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403, etc.".

U.S. Pat. Nos. 3,804,763 and 3,948,800 are expressly incorporated herein by reference for their disclosure of such polyoxyalkylene polyamines and process for acylating them with carboxylic acid acylating agents which processes can be applied to their reaction with the acylating reagents used in this invention.

The nitrogen-containing carboxylic dispersant may be derived from a polyamine. The polyamine may be aliphatic, cycloaliphatic, heterocyclic or aromatic. Examples of the polyamines include alkylene polyamines, hydroxy containing polyamines, arylpolyamines, and heterocyclic polyamines.

Alkylene polyamines are represented by the formula

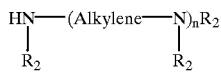

wherein n has an average value from 1 to about 10, preferably about 2 to about 7, more preferably about 2 to about 5, and the "Alkylene" group has from 1 to about 10 carbon atoms, preferably about 2 to about 6, more preferably about 2 to about 4. R$_2$ is independently preferably hydrogen; or an aliphatic or hydroxy-substituted aliphatic group of up to about 30 carbon atoms. Preferably R$_2$ is defined the same as R'$_1$.

Such alkylene polyamines include methylene polyamines, ethylene polyamines, butylene polyamines, propylene polyamines, pentylene polyamines, etc. The higher homologs and related heterocyclic amines such as piperazines and N-amino alkyl-substituted piperazines are also included. Specific examples of such polyamines are ethylene diamine, triethylene tetramine, tris-(2-aminoethyl)amine, propylene diamine, trimethylene diamine, tripropylene tetramine, tetraethylene pentamine, hexaethylene heptamine, pentaethylenehexamine, etc.

Higher homologs obtained by condensing two or more of the above-noted alkylene amines are similarly useful as are mixtures of two or more of the aforedescribed polyamines.

Ethylene polyamines, such as those mentioned above, are useful. Such polyamines are described in detail under the heading Ethylene Amines in Kirk Othmer's "Encyclopedia of Chemical Technology", 2d Edition, Vol. 7, pages 22–37, Interscience Publishers, New York (1965). Such polyamines are conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as the aforedescribed piperazines. Ethylene polyamine mixtures are useful.

Other useful types of polyamine mixtures are those resulting from stripping of the above-described polyamine mixtures to leave as residue what is often termed "polyamine bottoms". In general, alkylene polyamine bottoms can be characterized as having less than two, usually less than 1% (by weight) material boiling below about 200° C. A typical sample of such ethylene polyamine bottoms obtained from the Dow Chemical Company of Freeport, Tex. designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably diethylenetriamine), 0.72% triethylenetetraamine, 21.74% tetraethylene pentamine and 76.61% pentaethylene hexamine and higher (by weight). These alkylene polyamine bottoms include cyclic condensation products such as piperazine and higher analogs of diethylenetriamine, triethylenetetramine and the like.

These alkylene polyamine bottoms can be reacted solely with the acylating agent or they can be used with other amines, polyamines, or mixtures thereof.

Another useful polyamine is a condensed polyamine which is a condensation reaction product prepared by reacting at least one hydroxy compound with at least one polyamine reactant containing at least one primary or secondary amino group. The hydroxy compounds are preferably polyhydric alcohols and amines. Preferably the hydroxy compounds are polyhydric amines. Polyhydric amines include any of the above-described monoamines reacted with an alkylene oxide (e.g., ethylene oxide, propylene oxide, butylene oxide, etc.) having 2 to about carbon atoms, preferably 2 to about 4. Examples of polyhydric amines include tri-(hydroxypropyl)amine, tris-(hydroxymethyl)aminomethane, 2-amino-2-methyl-1,3-propanediol, diethanolamine, N,N,N',N'-tetrakis(2-hydroxypropyl)ethylenediamine, and N,N,N',N'-tetrakis(2-hydroxyethyl)ethylenediamine, preferably tris (hydroxymethyl)aminomethane (THAM).

Polyamine reactants, which react with the polyhydric alcohol or amine to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C., (preferably about 200° C. to about 250° C.) in the presence of an acid catalyst.

The amine condensates and methods of making the same are described in Steckel, U.S. Pat. No. 5,053,152 which is incorporated by reference for its disclosure to the condensates and methods of making. The preparation of such polyamine condensates may occur as follows: A 4-necked 3-liter round-bottomed flask equipped with glass stirrer, thermowell, subsurface N$_2$ inlet, Dean-Stark trap, and Friedrich condenser is charged with: 1299 grams of HPA Taft Amines (amine bottoms available commercially from Union Carbide Co. with typically 34.1% by weight nitrogen and a nitrogen distribution of 12.3% by weight primary amine, 14.4% by weight secondary amine and 7.4% by weight tertiary amine), and 727 grams of 40% aqueous tris-(hydroxymethyl)aminomethane (THAM). This mixture is heated to 60° C. and 23 grams of 85% H$_3$PO$_4$ is added.

The mixture is then heated to 120° C. over 0.6 hour. With N₂ sweeping, the mixture is then heated to 150° C. over 1.25 hour, then to 235° C. over 1 hour more, then held at 230–235° C. for 5 hours, then heated to 240° C. over 0.75 hour, and then held at 240–245° C. for 5 hours. The product is cooled to 150° C. and filtered with a diatomaceous earth filter aid. Yield: 84% (1221 grams).

In another embodiment, the polyamines are hydroxy-containing polyamines. Hydroxy-containing polyamine analogs of hydroxy monoamines, particularly alkoxylated alkylenepolyamines (e.g., N,N(diethanol)ethylene diamine) can also be used. Such polyamines can be made by reacting the above-described alkylene amines with one or more of the above-described alkylene oxides. Similar alkylene oxide-alkanol amine reaction products can also be used such as the products made by reacting the aforedescribed primary or secondary alkanol amines with ethylene, propylene or higher epoxides in a 1.1 to 1.2 molar ratio. Reactant ratios and temperatures for carrying out such reactions are known to those skilled in the art.

Specific examples of alkoxylated alkylenepolyamines include N-(2-hydroxyethyl) ethylenediamine, N,N-bis(2-hydroxyethyl)ethylenediamine, 1-(2-hydroxyethyl)-piperazine, mono (hydroxypropyl)-substituted tetraethylene-pentamine, N-(3-hydroxybutyl)-tetramethylene diamine, etc. Higher homologs obtained by condensation of the above-illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

In another embodiment, the amine is a heterocyclic polyamine. The heterocyclic polyamines include aziridine, azetidines, azolidines, tetra- and dihydropyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-diaminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkylsubstituted piperidines, piperazine, aminoalkyl-substituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethylpiperazine. Hydroxy heterocyclic polyamines are also useful. Examples include N-(2-hydroxyethyl) cyclohexylamine, 3-hydroxy-cyclopentylamine, N-hydroxyethylpiperazine, and the like.

Hydrazine and substituted-hydrazine can also be used to form nitrogen-containing carboxylic dispersants. At least one of the nitrogens in the hydrazine must contain a hydrogen directly bonded thereto. Preferably there are at least two hydrogens bonded directly to hydrazine nitrogen and, more preferably, both hydrogens are on the same nitrogen. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy substituted phenyl or lower alkyl substituted phenyl. Specific examples of substituted hydrazines are methylhydrazine, N,N-dimethylhydrazine, N,N'-dimethylhydrazine, phenylhydrazine, N-phenyl-N'-ethylhydrazine, N-(para-tolyl)-N'-(n-butyl)-hydrazine, N-(para-nitrophenyl)-hydrazine, N-(para-nitrophenyl)-N-methyl-hydrazine, N,N'-di-para-chlorophenol)-hydrazine, N-phenyl-N'-cyclohexylhydrazine, and the like.

Nitrogen-containing carboxylic dispersants and methods for preparing the same are described in U.S. Pat. Nos. 4,234,435; 4,952,328; 4,938,881; 4,957,649; and 4,904,401. The disclosures of nitrogen-containing carboxylic dispersants and other dispersants contained in those patents is hereby incorporated by reference.

The following examples illustrate nitrogen-containing carboxylic dispersants and methods for preparing them.

EXAMPLE 1

A mixture is prepared by the addition of 8.16 parts (0.20 equivalent) of a commercial mixture of ethylene polyamines having from about 3 to about 10 nitrogen atoms per molecule to 113 parts of mineral oil and 161 parts (0.24 equivalent) of the substituted succinic acylating agent prepared in Example I at 138° C. The reaction mixture is heated to 150° C. in 2 hours and stripped by blowing with nitrogen. The reaction mixture is filtered to yield the filtrate as an oil solution of the desired product.

EXAMPLE 2

A mixture is prepared by the addition of 18.2 parts (0.433 equivalent) of a commercial mixture of ethylene polyamines having from about 3 to 10 nitrogen atoms per molecule to 392 parts of mineral oil and 348 parts (0.52 equivalent) of the substituted succinic acylating agent prepared in Example II at 140° C. The reaction mixture is heated to 150° C. in 1.8 hours and stripped by blowing with nitrogen. The reaction mixture is filtered to yield the filtrate as an oil solution (55% oil) of the desired product.

Examples 3 through 8 are prepared by following the general procedure set forth in Example 1.

| Example Number | Amine Reactant(s) | Equivalent Ratio of Acylating Agent (Ex. I) to Reactants | Percent Diluent |
|---|---|---|---|
| 3 | Pentaethylene hexamine[a] | 4:3 | 40% |
| 4 | Tris(Z-aminoethyl) amine | 5:4 | 50% |
| 5 | Imino-bis-propyl-amine | 8:7 | 40% |
| 6 | Hexamethylene diamine | 4:3 | 40% |
| 7 | 1-(2-Aminoethyl)-2-methyl-2-imidazoline | 5:4 | 40% |
| 8 | N-Aminopropyl-pyrrolidone | 8:7 | 40% |

[a]A comercial mixture of ethylene polyamines corresponding in empirical formula to pentaethylene hexamine.

EXAMPLE 9

A mixture of 3660 parts (6 equivalents) of a substituted succinic acylating agent prepared as in Example I in 4664 parts of diluent oil is prepared and heated at about 110° C. whereupon nitrogen is blown through the mixture. To this mixture there are then added 210 parts (5.25 equivalents) of an alkylene polyamine mixture, comprising 80% of ethylene polyamine bottoms from Union Carbide and 20% of a commercial mixture of ethylene polyamines corresponding in empirical formula to diethylene triamine, over a period of one hour and the mixture is maintained at 110° C. for an additional 0.5 hour. The polyamine mixture is characterized as having an equivalent weight of about 43.3. After heating for 6 hours at 155° C. while removing water, a filtrate is added and the reaction mixture is filtered at about 150° C. The filtrate is the oil solution of the desired product.

EXAMPLE 10

A mixture of 140 parts of toluene and 400 parts of a polyisobutenyl succinic anhydride (the poly(isobutene) having a molecular weight of about 850, vapor phase osmometry) having a saponification number of 109 and 63.6 parts of an ethylene amine mixture having an average composition corresponding in stoichiometry to tetraethylene pentamine, is heated to 150° C. while the water/toluene azeotrope is removed. The reaction mixture is then heated to 150° C. under reduced pressure until toluene ceases to distill. The residual acylated polyamine has a nitrogen content of 4.7%.

EXAMPLE 11

A 12 liter flask equipped with a stirrer, thermowell, sub-surface $N_2$ inlet and Dean-Stark trap is charged with 460 parts of the condensed polyamine derived from the phosphoric acid catalyzed reaction of 5 equivalents (per nitrogen) of tetraethylene pentamine and 1.5 equivalents (OH) of tris-(hydroxymethyl)aminomethane (THAM) and 2500 parts mineral oil. The mixture is heated to 105° C. and 3360 parts of poly(isobutene ($\overline{M}n$ 1000)) substituted succinic anhydride having a saponification number of 100 is added over 1.5 hours. The mixture is heated to 160° C. with slow $N_2$ and is held at 160° C. for 5 hours. The reaction product is filtered at 150° C. with diatomaceous earth filter aid to provide a product containing 40% oil, 2.31% nitrogen and a total base number of 49.1.

EXAMPLE 12

Following substantially the procedure of Example 11, 1000 parts of the polybutene substituted succinic anhydride is reacted with 152 parts of a condensed amine derived from the reaction of 1000 parts polyamine bottoms (HPA #1) with 205 parts of THAM in the presence of 15.9 parts of 85% phosphoric acid. The product contains 40% mineral oil diluent, 2.15% nitrogen, and total base number 50.5.

EXAMPLE 13

To a reactor are charged 1145 parts of the product of Example V and 36.5 parts of a mixture of commercial ethylene polyamines having from 3 to about 10 nitrogen atoms per molecule and a nitrogen content of about 35 percent. The materials are heated under nitrogen to 155° C. and held at 155–160° C. for 8 hours, collecting 3.3 parts water in a Dean-Stark trap. Xylene (495 parts) is added and the solution is vacuum filtered employing a diatomaceous earth filter aid.

The dispersant may also be an amine dispersant. Amine dispersants are hydrocarbyl-substituted amines. These hydrocarbyl-substituted amines are well known to those skilled in the art. These amines are disclosed in U.S. Pat. Nos. 3,275,554; 3,438,757; 3,454,555; 3,565,804: 3,755,433; and 3,822,289. These patents are hereby incorporated by reference for their disclosure of hydrocarbyl amines and methods of making the same.

Typically, useful amine dispersants are prepared by reacting halogenated olefins and halogenated olefin polymers (polyalkenes) with amines (mono- or polyamines). The polyalkene may be any of the polyalkenes described above. The amines may be any of the amines described above.

EXAMPLE 14

A reactor is charged with 126 parts of mineral oil, 636 parts $Na_3CO_3$, and 567 parts of tetraethylene pentamine. The mixture is heated to 125° C. under a subsurface $N_2$ sparge. At 130° C., 4464 parts of chlorinated polybutene (4.74% Cl) is added over 0.5 hours. Following this addition, the materials are heated at 130° C. for 6 hours with vigorous stirring, then the temperature is increased to 150° C. and held there for an additional 12 hours. Low boiling materials are removed by heating the mixture to 200° C. then the residue is vacuum stripped at 200° C. at 20 mm Hg pressure for 2 hours. The materials are cooled to 180° C. at which time 140 parts of an aromatic hydrocarbon diluent are added followed by mixing and filtration. The filtrate is the product.

The dispersant may also be a Mannich dispersant. Mannich dispersants are generally formed by the reaction of at least one aldehyde, at least one of the above described amine and at least one alkyl substituted hydroxyaromatic compound. The reaction may occur from room temperature to 225° C., usually from 50° to about 200° C. (75° C.–150° C. most preferred), with the amounts of the reagents being such that the molar ratio of hydroxyaromatic compound to formaldehyde to amine is in the range from about (1:1:1) to about (1:3:3).

The first reagent is an alkyl substituted hydroxyaromatic compound. This term includes phenols (which are preferred), carbon-, oxygen-, sulfur- and nitrogen-bridged phenols and the like as well as phenols directly linked through covalent bonds (e.g. 4,4'-bis(hydroxy)biphenyl), hydroxy compounds derived from fused-ring hydrocarbon (e.g., naphthols and the like); and polyhydroxy compounds such as catechol, resorcinol and hydroquinone. Mixtures of one or more hydroxyaromatic compounds can be used as the first reagent.

The hydroxyaromatic compounds are those substituted with at least one, and preferably not more than two, aliphatic or alicyclic groups having at least about 6 (usually at least about 30, more preferably at least 50) carbon atoms and up to about 400 carbon atoms, preferably 300, more preferably 200. These groups may be derived from the above described polyalkenes. In one embodiment, the hydroxy aromatic compound is a phenol substituted with an aliphatic or alicyclic hydrocarbon-based group having an $\overline{M}n$ of about 420 to about 10,000.

The second reagent is a hydrocarbon-based aldehyde, preferably a lower aliphatic aldehyde. Suitable aldehydes include formaldehyde, benzaldehyde, acetaldehyde, the butyraldehydes, hydroxybutyraldehydes and heptanols, as well as aldehyde precursors which react as aldehydes under the conditions of the reaction such as paraformaldehyde, paraldehyde, formalin and methal. Formaldehyde and its precursors (e.g., paraformaldehyde, trioxane) are preferred. Mixtures of aldehydes may be used as the second reagent.

The third reagent is any amine described above. Preferably the amine is a polyamine as described above.

Mannich dispersants are described in the following patents: U.S. Pat. No. 3,980,569; U.S. Pat. No. 3,877,899; and U.S. Pat. No. 4,454,059 (herein incorporated by reference for their disclosure to Mannich dispersants).

EXAMPLE 15

Phenol (4 moles) and 2000 molecular weight polyisobutylene (1 mole) are reacted at 10° C. using $BF_3$ (0.2 moles)

as catalyst and toluene (2000 grams) as solvent. After stirring for 3 hours, the catalyst is deactivated by adding NH$_3$ (0.21 moles) and filtering off the complex at room temperature. The filtrate is stripped to remove excess phenol, the solvent and low molecular weight phenols.

The polyisobutylene alkylated phenol (1000 grams) is reacted with formaldehyde (0.8 mole) in xylene (500 grams) at 80 to 100° C. using 0.1 mole KOH as catalyst. After 4 hours the KOH is neutralized with 0.1 mole of acetic acid. Pentaethylene hexamine (0.25 moles) is diluted with 300 grams of xylene and rapidly stirred while the alkylphenol-formaldehyde reaction product is added over a one hour period at 90 to 100° C., while water is removed using an azeotrope trap. The reaction mixture is heated to reflux over a two hour period while removing water, cooled to 80° C. and filtered to give the alkylphenol-Mannich product. Theory analyses are TBN=53, % N=1.1.

The dispersant may also be a nitrogen-containing dispersant-viscosity improver. The dispersant-viscosity improvers include polymer backbones which are functionalized by reacting with an amine source and acylated polymer backbones, e.g., polymeric backbones which have been reacted with maleic anhydride and then with an amine compound. A true or normal block copolymer or a random block copolymer, or combinations of both are utilized. They are hydrogenated before use in this invention to remove virtually all of the olefinic double bonds. Techniques for accomplishing this hydrogenation are well known to those of skill in the art. Briefly, hydrogenation is accomplished by contacting the copolymers with hydrogen at superatmospheric pressures in the presence of a metal catalyst such as colloidal nickel, palladium supported on charcoal, etc.

In general, it is preferred that these block copolymers, for reasons of oxidative stability, contain no more than about 5 percent and preferably no more than about 0.5 percent residual olefinic unsaturation on the basis of the total number of carbon-to-carbon covalent linkages within the average molecule. Such unsaturation can be measured by a number of means well known to those of skill in the art, such as infrared, NMR, etc. Most preferably, these copolymers contain no discernible unsaturation, as determined by the aforementioned analytical techniques.

The block copolymers typically have number average molecular weights ($\overline{Mn}$) in the range of about 10,000 to about 500,000, preferably about 30,000 to about 200,000. The weight average molecular weight ($\overline{Mw}$) for these copolymers is generally in the range of about 50,000 to about 500,000, preferably about 30,000 to about 300,000.

For functionalizing a polymer backbone with an amine, the amine source usually is an unsaturated amine compound. The acylating agent is usually an unsaturated carboxylic reagent which is capable of reacting with an amine. The unsaturated carboxylic reagents and amines are described above.

Examples of dispersant-viscosity improvers are given in the following references:

| | |
|---|---|
| EP 171,167 | 3,687,905 |
| 3,687,849 | 4,670,173 |
| 3,756,954 | 4,320,012 |
| 4,320,019 | |

The above dispersants may be post-treated with one or more post-treating reagents selected from the group consisting of alkenyl cyanides, carboxylic acid acylating agents, aldehydes, ketones, urea, guanidine, dicyanodiamide, hydrocarbyl isocyanates, epoxides and formaldehyde or formaldehyde-producing compounds.

The following U.S. Patents are expressly incorporated herein by reference for their disclosure of post-treating processes and post-treating reagents applicable to the carboxylic derivative compositions of this invention: U.S. Pat. Nos. 3,087,936; 3,254,025; 3,256,185; 3,278,550; 3,282,955; 3,284,410; 3,338,832; 3,533,945; 3,639,242; 3,708,522; 3,859,318; 3,865,813; 4,234,435; etc. U.K. Patent Nos. 1,085,903 and 1,162,436 also describe such processes.

Diesel Fuels

The diesel fuels that are useful with this invention can be any diesel fuel. In one embodiment these diesel fuels have a sulfur content of no more than about 0.1% by weight, preferably no more than about 0.05% by weight as determined by the test method specified in ASTM D 2622-87 entitled "Standard Test Method for Sulfur in Petroleum Products by X-Ray Spectrometry". Any fuel having a boiling range and viscosity suitable for use in a diesel-type engine can be used. These fuels typically have a 90% Point distillation temperature in the range of about 300° C. to about 390° C., preferably about 330° C. to about 350° C. The viscosity for these fuels typically ranges from about 1.3 to about 24 centistokes at 40° C. These diesel fuels can be classified as any of Grade Nos. 1-D, 2-D or 4-D as specified in ASTM D 975 entitled "Standard Specification for Diesel Fuel Oils". These diesel fuels can contain alcohols and esters. Most diesel fuels are petroleum based, but vegetable oils are also useful.

In addition to the nitrogen-containing dispersants discussed hereinabove the fuel compositions of this invention may contain, on an optional as-needed basis other additives commonly used in diesel fuel oils. By optional is meant that these additives may be added, if required to obtain the performance benefit imparted thereby, or they may be excluded from the composition.

Such other additives include cetane number improvers such as alkyl nitrates, peroxides, sulfides, etc., smoke suppressants such as organometallic compounds, corrosion inhibitors, additives which promote the ignition of particulates collected on traps within the exhaust system, storage stabilizers, cold flow improvers, biocides and others. Such additives are well-known to the person of ordinary skill in the diesel fuel art.

As indicated hereinabove, the selected nitrogen-containing dispersants described herein provide unexpectedly superior cleanliness of diesel fuel injectors. Many dispersants are known in the art, and many do perform in an acceptable manner. The superior performance of the specific dispersants employed in the fuel compositions is an unexpected benefit, providing premium fuels which perform in an exceptional manner.

The dispersants employed in the diesel fuel compositions of this invention are used in amounts sufficient to prevent or reduce the formation of deposits on diesel fuel injector systems. These amounts, on a diluent-free basis typically range from about 5 to about 500 pounds per thousand barrels of diesel fuel, preferably from about 10 to about 100, more preferably from about 15 to about 50 pounds, per thousand barrels of diesel fuel.

Assessment of the ability of dispersants to control fuel injector deposits may be accomplished in many different ways. A test that appears to correlate well with modern diesel hardware is described by T. R. Gallant, et al in SAE Paper 912331, "Cummins L-10 Injector Depositing Test to Evaluate Diesel Fuel Quality" presented at the Society of Automotive Engineers International Fuels and Lubricants Meeting, Toronto, Ontario, Canada, October, 1991. This publication is hereby incorporated herein by reference.

Briefly, the injector deposit test employs two 1988 Cummins L-10 engines connected in series front to rear with a driveshaft. Throttle levers are simultaneously cycled between closed throttle motoring and full throttle fueling every 15 seconds for a total of 125 hours. While one engine is powering (approximately 55 to 65 horsepower) the other engine is closed throttle motoring. After test, injector travel, intake valve lash and exhaust valve lash are measured to insure that engine and injector adjustments are maintained throughout the test.

After test, injector flow rates are measured and injectors are partially disassembled to visually assess deposit level. This assessment is conducted employing the CRC (Coordinating Research Council) method which separately rates carbon and varnish, assigning values to each. A rating of 100 signifies 100% heavy carbon while varnish and lighter amounts of carbon are rated as a percentage of the coverage. An injector which is free of deposits is assigned a value of zero.

As indicated hereinabove, occasionally small amounts of deposit are present which still adversely affect flow rate or large amounts of deposit are present with little effect on flow rate.

To provide an indication of overall performance, considering both flow rate and visual appearance, an additional rating number is assigned which is obtained by multiplying the CRC rating by the percent flow loss. A "pass" is 85 or less.

The following tables illustrate the exceptional performance obtained employing fuel compositions of this invention. All amounts, including treating levels and nitrogen content, are presented on an oil- and diluent free basis.

TABLE I

Diesel Fuel Oil Composition +

| DISPERSANT | TREATING LEVEL | $\overline{M}w$ | % N | Mw × % N | CRC RATING | % FLOW LOSS | CRC × % FLOW LOSS |
|---|---|---|---|---|---|---|---|
| Polybuten(1000)yl succinic anhydride/condensed polyamine (1 eq:1.5 N) reaction product | 27 PTB | 18107 | 3.58 | 64460 | 10.0 | 2.4 | 24 |
| Polybuten(1800)yl succinic anhydride/condensed polyamine (1 eq:2N) reaction product | 27 PTB | 15000 | 4.08 | 52000 | 13.1 | 4.7 | 61.6 |
| Polybuten(1000)yl succinic anhydride/condensed polyamine (1 eq:1.1N) reaction product | 27 PTB | 21069 | 2.66 | 56184 | 16.6 | 3.5 | 58.1 |
| Polybuten(1800)yl succinic anhydride/ethylene polyamine (1 eq:1.02N) reaction product | 21 PTB | 22878 | 2.34 | 53534 | 13.95 | 3.25 | 45.3 |
| Polybuten(1000)yl succinic anhydride/condensed polyamine (1 eq:1.65N) reaction product | 27 PTB | 19000 | 3.6 | 68400 | 13.6 | 5.5 | 74.8 |
| Polybuten(1000)yl succinic anhydride/condensed polyamine (1 eq:2N) reaction product | 27 PTB | 19000 | 4.23 | 80433 | 20.8 | 4.0 | 83.2 |

For comparative purposes, the following data show the effect of dispersants that do not meet the requirements specified in the claims of this invention.

TABLE II

Diesel Fuel Oil Composition +

| DISPERSANT | TREATING LEVEL | Mw | % N | Mw × % N | CRC RATING | % FLOW LOSS | CRC × FLOW LOSS |
|---|---|---|---|---|---|---|---|
| Ethoxylated imidazoline from naphthenic/oleic acids | 40 PTB | 500 | 8.1 | 4050 | 14.0 | 6.2 | 87.3 |
| Polybutyl(1000) substituted amino phenol | 60 PTB | 1200 | 1.1 | 1300 | 51.1 | 3.3 | 169 |
| Polybuten(1000)yl succinic anhydride/ethylene polyamine (1 eq:1.5N) reaction product | 27 PTB | 10479 | 3.33 | 34895 | 38.5 | 6.7 | 258 |
| Polybuten(1000)yl succinic anhydride/ethylene polyamine (1 eq:1.0N) reaction product | 31 | 7185 | 2.57 | 18465 | 19.0 | 4.5 | 85.5 |

The fuel compositions of this invention are not only useful for keeping injectors clean but also provide the additional benefit of cleaning dirty injectors. This "clean-up" benefit is obtained by operating a diesel engine having diesel fuel injectors which have deposits thereon with diesel fuel compositions of this invention. Treating levels of dispersant are about the same as for "keep-clean" effect. However, increased amounts of dispersant, e.g. over 500 parts per thousand barrels of fuel (PTB) up to about 2000 PTB often provides quicker clean-up of dirty injectors, particularly when the injectors have a large amount of deposits thereon.

The dispersants and other additives used in the fuels of this invention can be added directly to the fuel, or they can be diluted with a substantially inert, normally liquid organic diluent such as naphtha, benzene, toluene, xylene or a normally liquid fuel as described above, to form an additive concentrate. These concentrates generally contain from about 20% to about 90% by weight of the composition of this invention and may contain, in addition one or more other conventional additives known in the art or described hereinabove.

The fuel additive compositions of this invention can be provided in concentrate form with less than the above-indicated levels of additives, and then be added directly to the fuel along with additional amounts of the compositions of this invention and other known additives, or be further diluted with additives prior to the addition to the fuel until the level of additives is at the desired level.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a major amount of a diesel fuel oil meeting ASTM Standard Specification D-975 and a minor amount, sufficient to minimize deposit formation on diesel engine fuel injectors and to maintain design flow rates of said injectors, of a nitrogen-containing carboxylic dispersant wherein the number obtained by multiplying the percent nitrogen of said dispersant by the weight average molecular weight of said dispersant ranges from about 45,000 to about 100,000.

2. The composition of claim 1 wherein the weight average molecular weight of the dispersant is at least about 2000.

3. The composition of claim 1 wherein the carboxylic dispersant is the reaction product of a polyamine with a hydrocarbyl substituted carboxylic acid.

4. The composition of claim 3 wherein the carboxylic acid is an aliphatic hydrocarbon group substituted succinic anhydride or functional equivalent thereof.

5. The composition of claim 4 wherein the aliphatic group is an alkyl or alkenyl group containing at least about 30 carbon atoms.

6. The composition of claim 3 wherein the polyamine is at least one member of the group consisting of alkylene polyamines and polyoxyalkylene polyamines.

7. The composition of claim 6 wherein the alkylene polyamine is a condensed polyamine which is the reaction product of a polyalkylene polyamine and a polyalkanol amine.

8. The composition of claim 1 wherein the dispersant is the reaction product of a condensed polyamine with an alkenyl substituted succinic anhydride wherein the alkenyl group is derived from a polyolefin having a number average molecular weight ranging from about 800 to about 3500.

9. The composition of claim 1 wherein the diesel fuel oil is derived from petroleum.

10. The composition of claim 1 wherein the diesel fuel oil comprises a vegetable oil.

11. The composition of claim 1 further comprising at least one member of the group consisting of a cetane number improver, a stabilizer, a corrosion inhibitor and a flow improver.

12. The composition of claim 1 wherein the diesel fuel comprises a mixture of vegetable oil and petroleum derived oil.

13. A method for cleaning diesel fuel injectors which comprises operating a diesel engine having diesel fuel injectors which have deposits thereon with a diesel fuel of claim 1.

* * * * *